Nov. 18, 1969 JUNJI YAMATO ET AL 3,479,462

EQUATIONAL TIMING SYSTEM IN TIME DIVISION MULTIPLEX COMMUNICATION

Filed Nov. 4, 1966 3 Sheets-Sheet 1

INVENTORS
Junji Yamato
Keiichi Tsukada
Masaichi Kajiwara
Masamichi Ono
BY
Watson, Cole, Grindle & Watson
ATTORNEYS Nov. 18, 1969 JUNJI YAMATO ET AL 3,479,462

EQUATIONAL TIMING SYSTEM IN TIME DIVISION MULTIPLEX COMMUNICATION

Filed Nov. 4, 1966 3 Sheets-Sheet 2

INVENTORS
Junji Yamato
Keiichi Tsukada
Masaaki Kajiwara
Masamichi Tono

BY
Watson, Cole, Grindle & Watson
ATTORNEYS

INVENTORS

Junji Yamato
Keiichi Tsukada
Masaichi Kajiwara
Masamichi Ito

BY

Watson, Cole, Grindle & Watson
ATTORNEYS

United States Patent Office 3,479,462

Patented Nov. 18, 1969

3,479,462

EQUATIONAL TIMING SYSTEM IN TIME DIVISION MULTIPLEX COMMUNICATION

Junji Yamato, Keiichi Tsukada, Masaichi Kajiwara, and Masamichi Ono, Tokyo, Japan, assignors to Nippon Telegraph and Telephone Public Corporation, Tokyo, Japan Filed Nov. 4, 1966, Ser. No. 592,160
Claims priority, application Japan, Nov. 10, 1965, 40/68,474
Int. Cl. H04j *3/00;* H04l *5/22*
U.S. Cl. 179—15 7 Claims

ABSTRACT OF THE DISCLOSURE

A timing system for synchronizing a plurality of time division multiplex communication switching centers by retuning the frequency of a local oscillation source associated with each switching center in accordance with timing difference signals obtained from the comparison of the propagation delay of signals received from an associated center with signals generated from the switching center being retuned in such a manner so as to reduce the timing difference between the received signals and the transmitted signals.

This invention relates to a timing system in a time division multiplex communication network. Its object is to carry out a timing control of such type as will make it possible to indefinitely expand a time division multiplex communication system network. More particularly it provides means to control the local oscillation source of controllable frequency of each switching center so that stabilized and correct timing may be always obtained between switching centers irrespective of the type of the organization of the communication network. Another object of the present invention is to obtain correct timing even in situations where faults may occur in the channels connecting switching centers and where the transmission delay time varies with variations in the temperature of the transmission cable.

A known timing system in time division multiplex communication networks uses one specific switching center among switching centers forming a communication network as a master switching center on which the timing of all the other switching centers depends. For example, in the case of a time division multiplex communication network formed of two switching centers A and B, one switching center, for example A, will generate a timing signal which will be transmitted to the other switching center B through a channel. In the switching center B, an operation required for this timing signal will be applied and, as soon as a time division multiplex communication signal is received, a communication signal will be sent out to the switching center A. In other words, the transmitting operation in the switching center B will be controlled by the receiving operation and the local timing signal of the switching center B will be phase locked with the incoming timing signal from the switching center A.

In the general case in which the clock frequency of the communication signal is high, the distance between the switching centers will exceed several of the timing signal wave lengths. Therefore, when the timing signal has come back to the switching center A through the switching center B, it will have a very complicated phase relation with the timing on the transmitting side determined by the distance which the timing signal will be transmitted and its transmission velocity. The propagation velocity of the timing signal depends on the characteristics of the transmission medium which varies mostly with the temperature of the transmission cable. Therefore, it is necessary to set a variable delay equalizer which can continuously adjust the delay time. Such an equalizer can be provided at a proper point in the line from the switching center A, to the switching center B or from the switching center B to the switching center A, for example, at the receiving point in the switching center A, so that the variation of the propagation delay time as caused by the variation of the transmission velocity of the timing signal may be equalized. Coincidence of the timing of the input signal with the timing of the output signal by such method, allows four-wire switching operation by highway switches and incoming directions switched on using the same timing wave in the switching center.

Now, the control of the timing by the above described phase equalization shall be considered as expanded to the case wherein a third switching center C is added. Now, if the timing of the switching center C depends on the timing of the switching center A through the switching center B, in case the communication channel between the switching centers A and B is faulty, the timing of the switching center B will no longer depend on the timing of the switching center A and, therefore, the timing of the switching center C will also no longer depend on the switching center A. Therefore, even if the communication channel directly connecting the switching centers A and C with each other is not faulty, communication between the switching centers A and C will become impossible.

In the timing system in which there is such master-slave relation between the timing of the switching centers in the time division multiplex communication network, a fault occurring in the master switching center, will prevent communication over the entire communication network. This will be caused by a fault in the local oscillation source or in the channel linking the master switching center and its adjacent switching center. The influence of such a fault will increase with the increase of the number of the switching centers forming the time division multiplex communication network and is undesirable. It can be solved in principle by reorganizing the timing system by designating another switching center for the master switching center when the master switching center is faulty. But, in such case, the apparatus and operation will become complicated and the reorganization will be complex. Even if such measures are taken, the timing system will still keep a master-slave relation. Therefore, measures must be prepared for the case wherein the newly designated master switching center is faulty.

According to the present invention there is provided a timing system in a time division multiplex communication network comprising a plurality of switching centers, each of which is linked by incoming and outgoing communication channels with at least one other switching center of the said plurality; a timing means at each center for controlling sequential operations at said center, including a plurality of channel synchronizing means connected to each pair of the incoming and outgoing communication channels and a timing control device connected sequentially to a plurality of the channel synchronizing means on a time division basis; each of said channel synchronizing means comprising means for equalizing the propagation delay time of said incoming communication channel connected in tandem therewith, a buffer memory device for compensating the change of said propagation delay time of said incoming communication channel and connected in tandem with said delay equalizing device, means connected to said buffer memory device for establishing a frame synchronization between a framing signal of a local timing source and a detected framing signal of an incoming communication signal. The timing device comprises means for detecting the delay time of the buffer memory device. The timing system further includes means for sending out the delay time information of said buffer memory to the other center linked with said incoming channel through said channel synchronizing means; means for receiving the delay time information of the buffer memory which is detected at said other switching center in the same manner as in each of said centers; means for comparing both of the delay times of the buffer memories; a local oscillation means of controllable frequency, and means for retuning the frequency of the local oscillation means to reduce the magnitude of the difference between the delay time of the buffer memories in reference to said comparison; and means for counting the output pulses of the local oscillation means to control the timing operation of each of the centers.

In the communication system to which is applied the present invention, each switching center in the time division multiplex communication network evenly contributes to the timing operation of the entire communication network but there is no master-slave relationship between the switching centers. That is to say, as far as the determination of the timing between switching centers, each switching center has an even opportunity to determine the ultimate timing established in the time division multiplex communication network. Therefore, if a fault occurs in the timing source of any switching center, the switching center does not aid in determining the timing existing between the switching centers of the time division multiplex communication network but the actual timing itself will not be appreciably influenced.

An apparatus of this kind is described in U.S. Patent 3,050,586.

However, in this system, an elastic delay device which can continuously vary the delay time is required in order to equalize the delay time between the switching centers. Such an elastic delay device, is complicated and costly and there is also the inherent probability that high frequency jitters included in the timing of the received signal will not be removed but will be fed directly into the switching apparatus. Further, the phases of the signals at the output terminals of the elastic delay devices connected to the respective channels do not correctly coincide with each other.

The present invention overcomes the aforedescribed problems and makes it possible to remove the jitters contained in the timing of the received signal and to feed the switching device with signals having phases coinciding with each other.

Specific embodiments of the invention will now be described by way of example with reference to the accompanying drawings in which.

In order to make it easy to understand the principle of the present invention, some quantitative relations shall be first explained.

Figure 1:
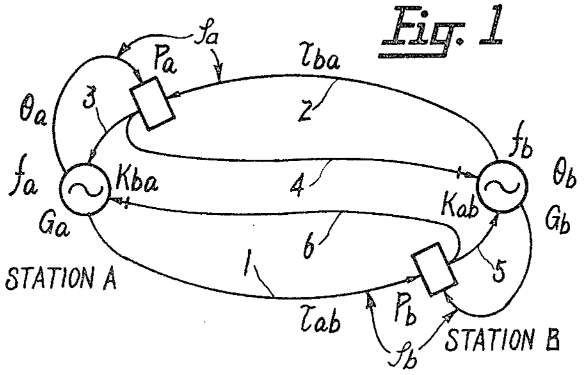
FIG. 1 illustrates the timing of a time division multiplex communication network according to the present invention.
Figure 3:
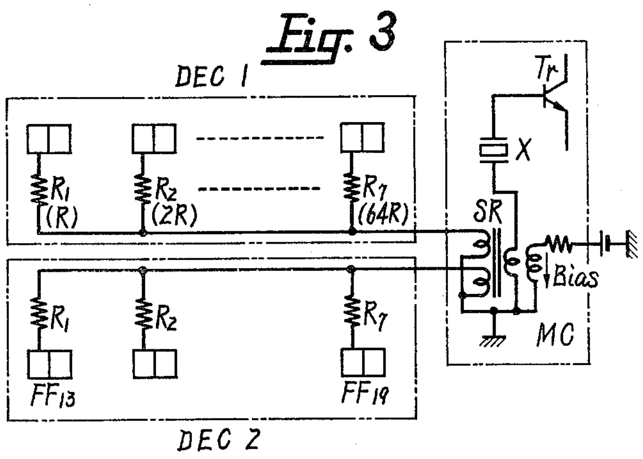
FIG. 3 is a circuit diagram showing an embodiment of a decoder circuit used in the embodiment shown in FIG. 2 and a frequency controlling circuit.

FIG. 1 shows a time division communication network comprising only two switching centers A and B. G$a$ and G$b$ are local oscillation sources of controllable frequency for the switching centers A and B, respectively. $fa$ and $fb$ are free running frequencies of the local oscillation source G$a$ and G$b$. Free running frequencies are defined as oscillation frequencies of the time generators in the case where there is no control signal to them. $\theta a$ and $\theta b$ are the ultimate phase of the local oscillation source G$a$ and G$b$, respectively. $\varphi a$ is a timing difference between the timing of the communication signal received at switching center A from switching center B and the timing generated at switching center A, and $\varphi b$ is a timing difference received at switching center B from switching center A and the timing generated at switching center B.

$\tau ab$ and $\tau ba$ are propagation delay times of a communication channel 1 from the switching center A to the switching center B and a channel 2 from the switching center B to the switching center A, respectively. P$a$ and P$b$ are detectors for detecting the timing difference and are located in the switching center A and B, respectively. The device P$a$ sends out via line 3 a direct current proportional to the timing difference $\varphi a$. The device P$b$ sends out via line 5 a direct current proportional to $\varphi b$.

K$ba$ and K$ab$ are frequency control constants of the respective local oscillation source. When the timing difference is $\varphi a$, the oscillation frequency of the local oscillation source G$a$ is increased by $\varphi a \times Kba$ cycles via a signal over line 3. Further, when the timing difference is $\varphi b$, line 6 leading from device P$b$ to the local oscillator source G$a$ will control the oscillation frequency of the local oscillation source G$a$, whereby said frequency decreases by $\varphi b \times Kba$ cycles. Lines 4 and 5 will also control the oscillation frequencies of the local oscillation source G$b$ in the same manner as the lines 6 and 3, control G$a$. Now if it is assumed that the time division multiplex communication network consisting of these two switching centers takes ultimate timing frequencies $f$ and is in a synchronous state (in which the oscillation frequencies of the generators G$a$ and G$b$ are pulled into the same frequency $f$), it will be easily understood that the following two equations will be established concerning the oscillation frequencies of the generators G$a$ and G$b$:

$$\begin{aligned} f &= fa + Kba\ \{\varphi a - \varphi b\} \\ &= fa + Kba\ [\{\theta a - (\theta b - 2\pi f \tau ba)\} \\ &\quad - \{\theta b - (\theta a - 2\pi f \tau ab)\}] \end{aligned} \tag{1}$$

$$\begin{aligned} f &= fb + Kab\ \{\varphi b - \varphi a\} \\ &= fb + Kab\ [\{\theta b - (\theta a - 2\pi f \tau ab)\} \\ &\quad - \{\theta a - (\theta a - 2\pi f \tau ba)\}] \end{aligned} \tag{2}$$

If the Equations 1 and 2 are solved with respect to $f$ and $(\theta a - \theta b)$, $$f = \frac{Kabfb + Kabfa}{Kba + Kab} \tag{3}$$

$$\theta a - \theta b = \frac{fa - fb}{2(Kab + Kba)} + \pi \frac{Kabfa + Kabfb}{Kab + Kba} (\tau ba - \tau ab) \tag{4}$$

The timing differences $\varphi a$ and $\varphi b$ case will be respectively as follows:

$$\varphi a = \frac{fa - fb}{2(Kab + Kba)} + \pi \frac{Kabfa + Kbafb}{Kab + Kba} (\tau ba + \tau ab) \tag{5}$$

$$\varphi b = \frac{fb - fa}{2(Kab + Kba)} + \pi \frac{Kabfa + Kbafb}{Kab + Kba} (\tau ba + \tau ab) \tag{6}$$

Therefore, $\varphi a - \varphi b$ is written as follows $$\varphi a - \varphi = \frac{fa - fb}{Kab + Kba} \tag{7}$$

It is found from Equation 3 that the ultimate frequency of the timing signal of the time division multiplex communication system will be approximately the mean value of the frequencies $fa$ and $fb$ if $Kab \approx Kba$. It is also found from the Equation 7 that the timing differences $\varphi a$ and $\varphi b$ are substantially equal to each other if $fa \approx fb$ and $fa - fb \ll Kab$ or $Kba$. This shows that the amount of delay to be equalized by the delay equalizer in the switching center A for the signal received by the switching center A from the switching center B, and the amount of delay to be equalized by the delay equalizer in the switching center B for the signal received by the switching center B from the switching center A, will be substantially equal to each other.

A time division communication system having two switching centers has been described above. It shall be shown following that, exactly the same relationship will be obtained even in a time division communication network including any number of switching centers. Now, a time division communication system consisting of a total number N of switching centers shall be considered. Assuming the free running frequency of the local oscillation source of the $m$th switching center is $fm$, the timing of the local oscillation source G$m$ when synchronization is established is $\theta m$, the frequency control factor of the $n$th channel linking the switching center and the $n$th switching center is $knm$ and the propagation delay time of the channel from the $n$th switching center to the $m$th switching center is $\tau nm$, then the following equation will be obtained:

$$f=fm+\sum_{n=1}^{N} Knm\,[\varphi nm-\phi mn]$$

$$=fm+\sum_{n=1}^{N} Knm\,[\{\theta m-(\theta n-2\pi f\tau nm)\}-\{\theta n-(\theta m-2\pi f\tau mm)\}] \quad (8)$$

wherein $m=1$ to N.

Here, assuming that $$\alpha m=1+2\pi\sum_{n=1}^{N} Knm(\tau nm-\tau mn) \quad (9)$$

$$Knn=0$$

then $$-2\theta m\sum_{n=1}^{N} Knm+2\sum_{n=1}^{N}\theta nKnm-f\alpha m=-fm \quad (10)$$

Further, the frequency control factors for communication channels in each switching center can be made absolutely the same irrespective of the other switching center. Therefore, $$Knm=Km \quad (11)$$

In such case, if the Equation 10 is solved with respect of $f$, $$f=\frac{\sum_{m=1}^{N}\frac{fm}{Km}}{\sum_{m=1}^{N}\frac{1}{Km}} \quad (12)$$

$$\tau mn=\tau nm \quad (13)$$

Even in the general case where there is no direct channel connecting the $m$th switching center to the $n$th switching center, by setting $Knm=Kmn=0$ in Equation 10, the same solution as in the Equations 12 and 13 will be obtained. Therefore, it is found that the ultimate frequency of the timing signal of the time division multiplex communication network when synchronization is established, will be substantially equal to the average frequency of $fm$ wherein $m=1$ to N.

Further, it is obvious from the above description when the time division mutiplex communication network is in a synchronous state, the amount of delay time to be equalized by the delay equalizer in the $m$th switching center for the signal received from the $n$th switching center, and the amount of delay to be equalized by the delay equalizer in the $n$th switching center for the signal received from the $m$th switching center, will be substantially equal to each other.

It is obvious from the above explanation that, in a time division communication system formed of any number of switching centers, the timing of each switching center can be synchronized by exchanging information of the time differences, between the respective switching centers.

The timing network in the time division multiplex communication system according to the present invention shall now be more particularly explained with reference to an illustrative embodiment.

A PCM signal as used in the explanation of this embodiment, is assumed to be a type wherein one frame is formed of pulse rows of a to'al of 193 bits wherein each frame is composed of 24 speech channels each of which is formed of 8 bits of code and of 1 bit for frame synchronization including a section between the frames in which "1" and "0" are repeated alternately frame by frame. But it is needless to say that the timing system according to the present invention can be also applied in the same manner to any PCM signals employing any other code systems as is mentioned above.

Figure 2:
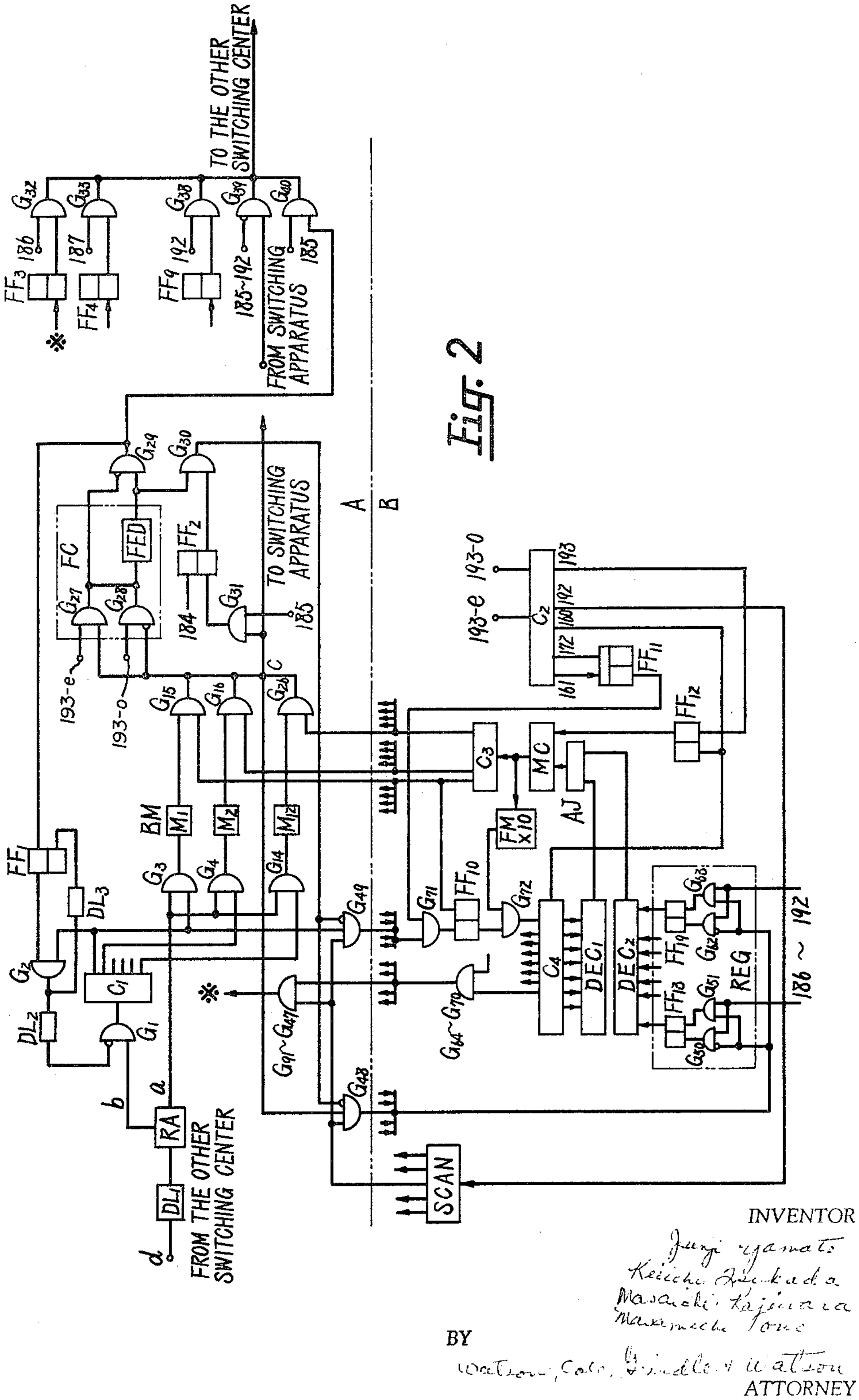
FIG. 2 is a circuit diagram of an embodiment of the present invention.

FIG. 2 shows an embodiment of a timing apparatus according to the present invention. This timing apparatus consists of a plurality of channel synchronizing means A which are required for each incoming and outgoing communication channels providing a two-way junction in a pair which is required for each switching center and is connected sequentially to each channel synchronizing means A on a time division basis. One set (generally consisting of a plurality of channel synchronizing means A and one timing device B of this timing apparatus is placed in each switching center (indicated by marks 0) included in such manner to compose the time division multiplex communication network.

In FIG. 2, $DL_1$, to $DL_3$ are delay circuits, RA is a PCM regenerative receiving amplifier, $C_1$ to $C_4$ are counters, MC is a local oscillation source of controllable frequency, $DEC_1$ and $DEC_2$ are decoders, $FF_1$ to $FF_{19}$ are flip-flops, BM is a buffer memory device, $M_1$ to $M_{12}$ are memory elements forming the buffer memory device, $G_1$ to $G_{72}$ are gates, REG is a register, SCAN is a scanner, FED is a frame error detector, FM is a frequency multiplier, AJ is a timing frequency control circuit and FC is a framing circuit.

A PCM signal received from the other switching center and applied to the input terminal $d$ delayed by the delay equalizer $DL_1$, is then applied and shaped by the regenerative receiving amplifier RA and is sent out to the line $a$. Then the PCM signal on this line $a$ passes through the gates $G_3$ to $G_{14}$ opened cyclically under the control of counter $C_1$, which counts the bit clock pulses $b$ extracted from the received PCM communication signal, and is written into the memory elements $M_1$ to $M_{12}$ of the buffer memory BFM. The signal written into the memory elements of the buffer memory is read out at the local bit rate on the line $c$ through the "and" gates $G_{15}$ to $G_{26}$, corresponding to the address indicated by the counter $C_3$ operated by the clock pulses from the local oscillation source MC. The delay time of the delay equalizer $DL_1$ is set so that the sum of the delay time of the delay equalizer $DL_1$, propagation delay time in the buffer memory of the channel between the switching centers, and the delay time obtained by the difference between the time of writing into and out of the buffer memory device, may coincide with the integral multiple of a frame repetition period of the PCM signal. If the propagation delay time of the transmission line is reduced due to the variation of the temperature of the transmission cable or the regenerative repeaters, the time of writing into the buffer memory device will be earlier and the delay time will be longer. Thereby, the reduction of the propagation delay time of the channel will be compensated. The number of memory elements forming the buffer memory device BM is to be able at least to compensate the maximum deviation of the propagation delay time, caused by variation of the atmospheric temperature throughout the year. The amount of the delay in the delay equalizer $DL_1$ is so set that the sum of the center value of the propagation delay time throughout the year in the communication channel and a half of the maximum amount of delay in the buffer memory device are an integral multiple of a frame repetition period of the PCM signal. Then, timing of the PCM signal sent out in the other switching center and the timing of the signal read out of the buffer memory device in each switching center can be made an integral multiple of a frame repetition period throughout the yearly variation of the atmospheric temperature. The timing of the PCM signal read out of the buffer memory device is synchronized by the framing circuit FC composed of gates $G_{27}$, $G_{28}$ and $G_{29}$ and the frame error detector FED, with the timing of the local oscillation source of the switching center. Thus, the gates $G_{27}$ and $G_{28}$ will pass the signals read out of the buffer memory device when the timing of the switching center is 193–*e* and 193–*o*, respectively (193–*e* is a time slot number of a frame synchronization bit in a frame in which the frame synchronization bit is "1" and 193–*o* is a time slot number of a frame synchronization bit in a frame in which the frame synchronization bit is "0"). Thus, when the frame synchronization bit "1" and "0" are received correctly, as when the synchronization of the timing is correctly made, the input to the frame error detector FED will be a "1" repeated at frame repetition frequency. On the other hand, in case the timing synchronization of the timings is not made, "0" will frequently mix into the signal provided to the frame error detector FED at frame repetition period. When the frame error detector FED detects thereby that the timing of the signal on the line *c* is not synchronized with the local timing of the switching center, it will open the gate $G_{29}$. Then, when the signal "0" is obtained at the time slot 193–*e* or 193–*o* on the output line of the gate $G_{27}$ or $G_{28}$, the signal will pass through the gate $G_{29}$ and will set the flip-flop $FF_1$. The state of the flip-flop $FF_1$ set by the signal will be read out through the "and" gate $G_2$ at the time when the received signal is written into the memory element $M_1$ of the buffer memory device BM. This signal closes the inhibiting gate $G_1$ after passing through the delay element $DL_2$ (having a delay time corresponding to about 1 time slot) and stops one of the clock pulses entering in to the counter $C_1$ from the regenerative receiving amplifier RA. Thus, the counting phase of the counter $C_1$ is delayed by one clock pulse period. As the time of writing into the buffer memory device is delayed by this operation, the delay time obtained by the buffer memory device BM will increase by one clock pulse period. By repeating such operation, the delay time in the buffer memory can be varied successively. The above described operation is continuously repeated several times (or a maximum of 11 times in the illustrated case) until a PCM signal correctly synchronized with the timing of the local timing of the switching center is obtained on the line *c*, then the output signal of the frame error detector FED becomes "0" and the gate $G_{29}$ is closed.

The flip-flop FF, is reset about ½ clock pulse period after the state of the flip-flop is read out, and the flip-flop is ready for receiving the next hunting signal which may come through the gate $G_{29}$.

By the above operation, the information written into a specific memory element of the buffer memory device BM will be read within the period of a maximum of 12 clock pulses. The timing of the switching center must be adjusted by controlling the frequency of the local oscillation source MC of the timing device B so that the delay time of the buffer memory is always within a period of 12 time slots. For this purpose, average clock rates of all the switching centers must be kept equal, then timing devices B in all the switching centers in the network cooperate as illustrated hereinafter.

The operation of the timing circuit B shall now be explained more in detail with reference to FIG. 2.

It shall be assumed that the received communication signal read out of the buffer memory device BM on the line *c* has been already synchronized with the timing of switching center B (therefore, of this timing apparatus)

by the operations of the flip-flop $FF_1$, gates $G_1$, $G_2$ and $G_{29}$ and framing circuit FC. At that time the channel synchronizing means, designated by the scanner SCAN, can be communicated to the timing device B through the gates $G_{41}$, $G_{47}$, $G_{48}$ and $G_{49}$. In order to measure the time after a signal is written into the memory element $M_1$ of the buffer memory device BM until it is read out, the following operation will take place. As soon as the counter $C_1$ opens the gate $G_3$, a pulse is sent to the flip-flop $FF_{10}$ through the gates $G_{49}$ and $G_{71}$ and the flip-flop $FF_{10}$ is set. The output of flip-flop $FF_{10}$ opens the gate $G_{72}$. Pulses formed by multiplying, for example by 10, the oscillation frequency of the local oscillation source, with the frequency multiplier FM are sent to the counter $C_4$ so that the counter $G_4$ may begin to count the number of the pulses. The counting by the counter $C_4$ is stopped at the time of reading the information written into the memory element $M_1$ of the buffer memory device BM through the gate $G_{15}$. For that purpose, by using the pulse derived from counter $C_3$ to open the gate $G_{15}$, the flip-flop $FF_{12}$ is reset and the gate $G_{72}$ is closed. The value counted by the counter $C_4$ in such a case indicates the above mentioned buffer memory delay time. However, as this counting operation may be made only once for one frame repetition period, the gate $G_{71}$ is opened and closed with the output of the flip-flop $FF_{11}$ which is set at the time slot 161 and reset at the time slot 172. Further, the counter $C_4$ is reset with the pulse of the 160th time slot which is the time slot just before the gate $G_{71}$ opens. By using such method, the delay time of the buffer memory device BM related to each switching center can be measured.

It shall now be assumed that the signal indicating the delay time, the buffer memory in the other switching center is sent using a part of the 24th speech channel of the communication signal, that is, 7 time slots, from the 186th to 192nd. In order to receive this signal indicating the delay time of the buffer memory, the signal on the line *c* is passed through the gates $G_{50}$ to $G_{63}$ opened in turn in the above mentioned time slots of from the 186th to 192nd, and is sent to the flip-flops $FF_{13}$ to $FF_{19}$ forming the register REG and stored. However, unless the signal sent from each switching center is received in a frame-synchronized state in the other switching center, the signal received in the 186th to 192nd time slots will not represent the delay time of the buffer memory in the other switching center. Therefore, whether the signal of the 186th to 192nd time slots sent from the other switching center should be compared with the buffer delay time of the switching center or not is known by the signal (appearing as an output of the gate $G_{31}$) received from the other switching center in the 185th time slot for showing whether the signal sent out of the switching center is received in a correctly synchronized state or not. The signal at the 185th time slot read out on the line *c* from memory BM (it has a value "1" when the channel synchronizing means in the other exchange is out of synchronization) passes through the AND gate $G_{31}$ which opens at the time slot 185, and said signal sets flip-flop $FF_2$ which is reset at every 184th time slot. The signal derived from $FF_2$ is passed through OR gate $G_{30}$ and inhibits gates $G_{41}$ to $G_{49}$ in order to isolate the channel synchronizing means A from timing device B.

Figure 4:
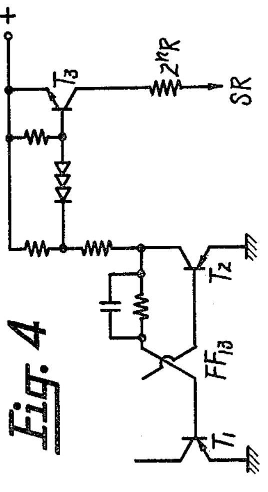
FIG. 4 is a circuit diagram of an embodiment of apparatus for converting digital signals to analog signals as is used in the embodiment in FIG. 2.

In order to control the frequency of the local oscillation source MC by comparing the stored contents of the register REG with the counted value of the counter $C_4$, first of all, a sum of currents weighted in response to respective digit positions is made from the respective digits of each flip-flop forming the counter $C_4$ and register REG and thereby currents proportional to the delay time of the buffer memory are obtained. These currents are fed to the control windings $W_1$ and $W_2$ of a saturable reactor SR inserted in series into a quartz vibrator X of a quartz oscillator as shown in FIG. 4 to control the timing frequency of the local oscillation source MC formed by this quartz oscillator.

Figure 5:
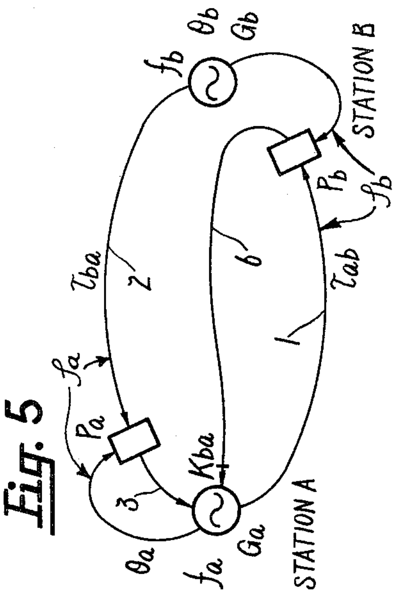
FIG. 5 is a block diagram of channel synchronizing means of another embodiment of the present invention.

The discrepancy between both currents can be obtained by reversing the winding directions of the control windings $W_1$ and $W_2$. In order to take currents weighted in response to the digit positions out of the flip-flops $FF_{13}$ to $FF_{19}$ or each flip-flop forming the counter $C_4$, the third transistor $T_3$ is driven with transistor $T_2$ and transistors $T_1$ and $T_2$ form a flip-flop circuit as shown in FIG. 5. Resistors connected to the collectors of the transistor $T_3$ are weighted in the form of $2^n$ wherein $n=0$ to 6 in resistance, so each of them derives a current weighted in the form of $(1/2)^n$ when the transistor $T_2$ is on.

Then, the information corresponding to the delay time of the buffer memory device BM of the switching center must be sent out to the other switching center. For that purpose, as the measurement of the buffer memory device delay time should have been completed by the 184th time slot at the latest, the resultant count of the counter $C_4$ is transfered to the flip-flops $FF_3$ to $FF_9$ in the 185th time slot. Then between the time slot 186 and time slot 192, the contents of the flip-flops $FF_3$ to $FF_9$ are sent out to the other switching center through the gates $G_{32}$ to $G_{38}$. The signal from gate $G_{40}$ is to be sent out to the other switching center in the time slot 185, the signal showing whether the delay time of the buffer memory device BM in the switching center thus sent out is reliable enough because the signal from the other switching center is being received in a correctly synchronized state in the switching center, or must not be used because the signal from the other switching center is not synchronized.

The inhibiting gate $G_{39}$ is to inhibit the unwanted signal (for example, the pulses sent during the period of the time slots 185 to 192 by mis-switching or the like of the switching apparatus) sent from the switching apparatus of the switching center from being sent to the other switching center during the period of the time slots 185 to 192.

In case the signal from the other switching center can not be received in a correctly synchronized state in each switching center and in case the signal sent out of each switching center can not be received in a correctly synchronized state in the other switching center, the gates $G_{48}$ and $G_{49}$ will not open and therefore the channel synchronizing means A will not be connected to the timing device B and will contribute nothing to the local oscillation source.

The above described control of the frequency of the timing generator is to be carried out on a time division basis for all or part of the channels existing between each switching center and the other switching centers connected to it. However, as the control per channel is for a short period less than 1 frame, the amount of phase correction during this period is so small that the phase of the counter $C_2$ will come to have a mean phase of the phases required by each channel device.

In the above described embodiment of the equational timing system according to the present invention, there has been described a method wherein the control of the frequency of the local oscillation source MC is made analogously with an amount proportional to the difference $\varphi a-\varphi b$. However,, the same synchronizing operation as in the above described embodiment of the present invention can be carried out also by increasing or decreasing by a fixed amount the timing frequency of the timing generator with two values depending on whether the value of $\varphi a-\varphi b$ is positive or negative, respectively. Further, the same synchronizing operation as in the above described embodiment of the present invention can be carried out even when, if the absolute value of $\varphi a-\varphi b$ is within a certain limit, the clock frequency of the timing generator is not controlled and, only when this limit is exceeded the clock frequency of the local oscillation source is increased or decreased by a fixed small value depending on whether the value of $\varphi a-\varphi b$ is positive or negative, respectively.

It is not necessary to connect on a time division basis all of the channels between the respective switching centers to the timing device B. Now, if it is assumed that there are three switching centers A, B and C and there are channels respectively between the switching centers A and B and between the switching centers B and C and that, these channels are connected to the respective timing device located in the switching centers A, B and C, the timing of the switching centers A, B and C will be in a synchronous state. In such a case, in providing a new channel between the switching centers A and C, as the switching centers A and C are already in a synchronized state, it is not necessary, in principle, to connect this line to the timing devices on a time division basis so as to contribute to the control of the timing frequencies of the local source of the switching centers A and C. However, in case a fault has occurred in the transmission line between the switching centers A and B, even if there is no fault in channel between the switching centers A and C, no synchronized state will be established between the switching centers A and C. In order to prevent this, as many time division multiplex transmission lines as determined by the organization of the communication system and the reliability of the respective channels may be connected to the timing device of the respective switching centers. Further, the number of channels to be connected to the timing device of the respective switching centers is also determined from the allowable value of the timing deviation between the respective switching centers. That is to say, when the free running frequencies and frequency control constants of the local oscillation source of the respective switching centers are all exactly equal and the propagation time delays of incoming and outgoing lines linking any two switching centers are exactly equal, aside from the problem of the reliability of the time division multiplex transmission line, if the respective switching centers are connected even via other switching centers, the timing of all the switching centers forming the time division multiplex communication system should be synchronized. However, in fact, this is impossible. Therefore, some deviation will be produced between the timing of the respective switching centers. If there is a deviation between the timing of the respective switching centers, the deviation will have to be absorbed in the delay time of the buffer memory and, therefore, the number of the memory elements required for the buffer memory device will increase. The timing deviation between the respective switching centers based on the difference of the propagation delay time of incoming and outgoing transmission lines can be reduced by averaging such propagation delay time differences by connecting to the timing device many channels from many other switching centers or many channels from any other specific switching center.

For the time division multiplex transmission line which is not required to be connected to the timing device for the above mentioned reasons, by providing only the part corresponding to the channel synchronizing means A, the received signal can be synchronized. In such a case, it is not necessary for these channel synchronizing means to exchange information with the other switching center. Therefore, such channel synchronizing means as shown in FIG. 6 may be placed in the channel. The signs and operations of the respective parts of the channel synchronizing means in FIG. 6 are exactly the same as the channel synchronizing means in FIG. 2. Therefore, their explanation is omitted here.

The present invention as applied to a time division multiplex communication network taking a net-shaped formation has been described above. But the present invention can be applied as described to a star-shaped time division multiplex communication network.

Further, it is also possible to modify the timing system according to the present invention to be in the following form. That is to say, for example, in the principle explained in FIG. 1, K*ab* is made *Kab*=0 so that the local oscillation source of the switching center B may not be controlled. The principle explaining such a case is aided with reference to FIG. 7. The various signs used in FIG. 7 all have the same meaning as in FIG. 1 and therefore their explanation shall be omitted. The timing synchronizing operation in this case is obtained by setting $Kab=0$ in the Equations 1, 4, 5, 6, and 7. That is to say, the equations corresponding to those equations are represented respectively by the following Formulas 15, 16, 17, 18 and 19:

$$f=f_b \qquad (15)$$

$$\theta a-\theta b=\frac{fa+fb}{2Kba}+\pi f_b(\tau ba-\tau ab) \qquad (16)$$

$$\varphi a=\frac{fa-fb}{2Kba}+\pi f_b(\tau ba+\tau ab) \qquad (17)$$

$$\varphi b=\frac{fb-fa}{2Kab}+\pi fb(\tau ba+\tau ab) \qquad (18)$$

$$\varphi a-\varphi b=\frac{fa-fb}{Kab} \qquad (19)$$

Therefore, in case $fa-fb\ll K_a$, the timing frequency of the switching center A will perfectly coincide with the timing frequency of the switching center B. Further, it is found that the timing of both switching centers A and B are synchorized with each other in a state in which the delay times of the buffer memories device in both switching centers A and B are equal to each other.

Such modified equational synchronizing apparatus as is described above is effective to simplify the formation of the timing device of the switching center B.

We claim:

1. A timing system for a time division multiplex communication system, comprising; a plurality of switching centers each of which is linked by paired incoming and outgoing communication channels with at least one other center of said plurality, timing means at each center for controlling sequential operations at said center, said timing means including a plurality of channel synchronizing means connected to each pair of said incoming and outgoing communication channels and timing control means connected to a plurality of said channel synchronizing means sequentially on a time division basis, each of said channel synchronizing means including means for equalizing propagation delay times of signals transmitted on said incoming communication channel connected in tandem therewith, buffer memory means for storing compensating changes of said propagation delay times and connected in tandem with said means for equalizing propagation delay times, means for establishing frame synchronization between a framing signal of a local timing source and a detected framing signal of an incoming communication signal and connected to said buffer memory means, said timing control means including means for detecting the delay times stored in said buffer memory means, means for transmitting said delay times to at least one other center linked with said incoming channel through said channel synchronizing means, said delay times are received at said other center through said incoming channel by said synchronizing means associated therewith in the same manner as in said each center, means at said at least one other center for comparing said received delay times with delay times stored in said buffer memory means associated therewith, local oscillation source means of controllable frequency, means responsive to said comparison means for retuning the frequency of said local oscillation means in a sense to reduce the magnitude of the difference between said compared delay times, and means for counting the output pulses of said local oscillation means, to control the timing operation of said each center.

2. A timing system according to claim 1, wherein the sum of the propagation delay time of each communication channel between respective centers and the delay time of said means for equalizing is set to be substantially an integral multiple of a frame repetition period of an incoming communication signal.

3. A timing system according to claim 1, wherein said local oscillation source means is controlled by the average value of said differences between said compared delay times each of which is detected at said time control means when each of a plurality of said channel synchronizing means is sequentially connected to said timing control means on said time division basis.

4. A timing system according to claim 1, wherein the frequency of said local oscillation source means is digitally controlled in one of two values depending on whether the value of said differences between said compared delay times is positive or negative.

5. A timing system according to claim 1, wherein the frequency of said local oscillation source means is digitally controlled in three values.

6. A timing system according to claim 1, wherein the frequency of said local oscillation source means is controlled in proportion to the average of said differences between said compared delay times.

7. A timing system according to claim 1, wherein said delay times also include read-in and read-out times of said buffer memory means.

References Cited

UNITED STATES PATENTS

| | | | |
|---|---|---|---|
| 2,843,669 | 7/1958 | Six et al. | 178—69.5 |
| 3,109,897 | 11/1963 | Carbrey | 179—15 |
| 3,050,586 | 8/1962 | Runyon | 179—15 |
| 3,351,858 | 11/1967 | Jowett et al. | 375—66 XR |

RICHARD MURRAY, Primary Examiner

C. R. VONHELLENS, Assistant Examiner

U.S. Cl. X.R.

178—53; 325—58